(12) United States Patent
Bhatt et al.

(10) Patent No.: US 11,588,813 B2
(45) Date of Patent: Feb. 21, 2023

(54) SYSTEMS AND METHODS FOR BIOMETRIC AUTHENTICATION USING EXISTING DATABASES

(71) Applicant: MASTERCARD INTERNATIONAL INCORPORATED, Purchase, NY (US)

(72) Inventors: Sumeet Bhatt, Jericho, NY (US); Ashfaq Kamal, Stamford, CT (US); Robert D. Reany, New Canaan, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 10 days.

(21) Appl. No.: 15/583,174

(22) Filed: May 1, 2017

(65) Prior Publication Data

US 2018/0167387 A1 Jun. 14, 2018

Related U.S. Application Data

(60) Provisional application No. 62/431,609, filed on Dec. 8, 2016.

(51) Int. Cl.
*H04L 9/40* (2022.01)
*G06F 16/955* (2019.01)
(Continued)

(52) U.S. Cl.
CPC ........ *H04L 63/0861* (2013.01); *G06F 16/955* (2019.01); *G06F 21/32* (2013.01);
(Continued)

(58) Field of Classification Search
CPC . H04L 63/0861; H04L 63/0853; H04L 63/10; H04L 63/062; H04L 63/0876;
(Continued)

(56) References Cited

U.S. PATENT DOCUMENTS 6,298,336 B1 10/2001 Davis et al.
7,028,185 B2 4/2006 Wheeler et al.
(Continued)

FOREIGN PATENT DOCUMENTS

CN 1488230 A 4/2004
CN 105103525 A 11/2015
(Continued)

OTHER PUBLICATIONS

International Search Report and Written Opinion for Application No. PCT/US2017/062519 dated Mar. 2, 2018 (11 pages).
(Continued)

*Primary Examiner* — Jeremy S Duffield
(74) *Attorney, Agent, or Firm* — Michael Best & Friedrich LLP

(57) ABSTRACT

Systems, methods, and non-transitory computer readable medium use external databases for biometric authentication. A server receives a request for authentication of a user from a requestor. A notification is sent to a user device associated with the user from the server. A biometric image is received within the server in response to the notification. A biometric ID of the user is sent from the server to an external database for identifying a biometric template stored with the external database. An authentication result indicative of a match between the biometric image and the biometric template is determined and the authentication result is sent to the requestor. The external databases are owned by a third party, and the biometric template of the user was previously generated and stored within the external database in association with the biometric ID.

23 Claims, 5 Drawing Sheets

(51) Int. Cl.
  *G06Q 20/00* (2012.01)
  *G06F 21/32* (2013.01)
  *G06Q 20/40* (2012.01)
  *G06Q 20/10* (2012.01)
  *G06Q 20/18* (2012.01)
  *G06Q 20/34* (2012.01)

(52) U.S. Cl.
  CPC ....... *G06Q 20/00* (2013.01); *G06Q 20/40145* (2013.01); *H04L 63/0853* (2013.01); *H04L 63/10* (2013.01); *G06F 2221/2117* (2013.01); *G06Q 20/1085* (2013.01); *G06Q 20/18* (2013.01); *G06Q 20/354* (2013.01); *H04L 63/062* (2013.01); *H04L 63/0876* (2013.01)

(58) Field of Classification Search
  CPC .......... G06F 21/32; G06F 21/30; G06F 21/31; G06F 16/955; G06Q 20/40–40145; G06Q 20/00; G06Q 20/1085; G06Q 20/18; G06Q 20/354

See application file for complete search history.

(56) References Cited

U.S. PATENT DOCUMENTS

| | | | |
|---|---|---|---|
| 7,225,338 | B2 | 5/2007 | Khan et al. |
| 7,367,049 | B1 | 4/2008 | Robinson et al. |
| 7,690,032 | B1* | 3/2010 | Peirce ................ G06Q 20/3676 726/9 |
| 7,780,091 | B2 | 8/2010 | Beenau et al. |
| 7,921,297 | B2* | 4/2011 | Ortiz ................... H04L 63/0861 713/182 |
| 8,489,513 | B2 | 7/2013 | Bishop et al. |
| 8,577,813 | B2 | 11/2013 | Weiss |
| 8,595,075 | B2 | 11/2013 | de Sylva |
| 8,706,630 | B2 | 4/2014 | Graves et al. |
| 8,831,994 | B1 | 9/2014 | Hoffman |
| 8,930,273 | B2 | 1/2015 | Varadarajan |
| 9,223,998 | B1* | 12/2015 | Grisso ................ H04L 63/1416 |
| 9,430,629 | B1 | 8/2016 | Ziraknejad et al. |
| 9,953,149 | B2 | 4/2018 | Tussy |
| 10,154,029 | B1* | 12/2018 | Griffin ............... H04L 63/0861 |
| 2001/0011680 | A1 | 8/2001 | Soltesz et al. |
| 2004/0010697 | A1* | 1/2004 | White .................... G06F 21/31 713/186 |
| 2008/0015994 | A1 | 1/2008 | Bonalle et al. |
| 2009/0037978 | A1* | 2/2009 | Luque ..................... G06K 9/00 726/2 |
| 2009/0076966 | A1 | 3/2009 | Bishop et al. |
| 2010/0175114 | A1 | 7/2010 | Little |
| 2010/0318783 | A1 | 12/2010 | Raj et al. |
| 2011/0145904 | A1* | 6/2011 | Pizano ................ H04L 63/0861 726/7 |
| 2011/0191249 | A1 | 8/2011 | Bishop et al. |
| 2012/0293642 | A1 | 11/2012 | Berini et al. |
| 2013/0067551 | A1* | 3/2013 | Frew ...................... G06Q 20/40 726/7 |
| 2014/0067683 | A1 | 3/2014 | Varadarajan |
| 2014/0081857 | A1 | 3/2014 | Bonalle et al. |
| 2014/0310182 | A1 | 10/2014 | Cummins |
| 2014/0337221 | A1 | 11/2014 | Hoyos |
| 2015/0012427 | A1 | 1/2015 | Phillips et al. |
| 2015/0058931 | A1* | 2/2015 | Miu ...................... H04L 63/126 726/3 |
| 2015/0227937 | A1* | 8/2015 | Giles ................ G06Q 20/40145 705/44 |
| 2015/0348018 | A1 | 12/2015 | Campos et al. |
| 2016/0019539 | A1 | 1/2016 | Hoyos et al. |
| 2016/0189063 | A1 | 6/2016 | Nie |
| 2016/0226868 | A1* | 8/2016 | Harding ............. H04L 63/0861 |
| 2016/0239655 | A1* | 8/2016 | Sadacharam ........... G06F 21/42 |
| 2016/0253669 | A1 | 9/2016 | Yoon et al. |
| 2016/0381013 | A1* | 12/2016 | Buscemi ................ H04L 63/10 726/4 |
| 2017/0255932 | A1* | 9/2017 | Aabye ..................... H04L 63/06 |
| 2017/0300678 | A1* | 10/2017 | Metke ................. H04L 63/0861 |
| 2018/0091505 | A1 | 3/2018 | Farrell et al. |
| 2018/0165676 | A1 | 6/2018 | Bhatt et al. |
| 2018/0167386 | A1 | 6/2018 | Bhatt et al. |
| 2018/0285868 | A1 | 10/2018 | O'Hara et al. |
| 2019/0147684 | A1* | 5/2019 | Tanaka ............... G06Q 20/3574 235/380 |
| 2020/0334347 | A1* | 10/2020 | Hoyos ................ H04L 63/0861 |

FOREIGN PATENT DOCUMENTS

| | | |
|---|---|---|
| EP | 2037421 A1 | 3/2009 |
| GB | 2531095 A | 4/2016 |
| WO | 2004/031920 A1 | 4/2004 |
| WO | 2010/084143 A1 | 7/2010 |
| WO | 2013/051010 A2 | 4/2013 |
| WO | 2017/055373 A1 | 4/2017 |
| WO | 2018/106430 A1 | 6/2018 |
| WO | 2018/106431 A1 | 6/2018 |
| WO | 2018/106432 A1 | 6/2018 |

OTHER PUBLICATIONS

International Search Report and Written Opinion for Application No. PCT/US2017/062525 dated Mar. 2, 2018 (14 pages).

International Search Report and Written Opinion for Application No. PCT/US2017/062527 dated Feb. 28, 2018 (14 pages).

Jordaan et al., "A Biometrics-Based Solution to Combat SIM Swap Fraud," ECCV 2016 Conference, 2016, Springer International Publishing, Cham, pp. 70-87.

Chinese Patent Office Action for Application No. 201780083235.3 dated Mar. 31, 2021 (22 pages, English translation included).

Australian Patent Office Examination Report No. 1 for Application No. 2017372477 dated Oct. 1, 2021 (3 pages).

Kadena et al., "Adoption of biometrics in mobile devices," Proceedings of FIKUSZ Symposium for Young Researches: 140-148, Budapest: Obuda, University Keleti Karoly Faculty of Economics, ProQuest Docuent Id: 2030411601 (Year 2017).

China National Intellectual Property Administration Notification of Second Office Action for Application No. 201780083235.3 dated Dec. 10, 2021 (16 pages including English translation).

Chinese Patent Office Action for Application No. 201780083235.3 dated Apr. 22, 2022 (15 pages including English translation).

Australian Patent Office Examination Report No. 2 for Application No. 2017372477 dated Apr. 27, 2022 (3 pages).

\* cited by examiner

SYSTEMS AND METHODS FOR BIOMETRIC AUTHENTICATION USING EXISTING DATABASES

RELATED APPLICATIONS

This application claims priority to U.S. patent application Ser. No. 62/431,609, titled "Systems and Methods for Decentralized Biometric Enrollment, Smartcard Biometric Enrollment, and Biometric Authentication Using Existing Databases", filed Dec. 8, 2016, incorporated herein in its entirety by reference. This application is co-filed with co-owned U.S. patent application Ser. No. 15/583,147, titled "Systems and Methods for Decentralized Biometric Enrollment" and co-owned U.S. patent application Ser. No. 15/583,085, titled "Systems and Methods for Smartcard Biometric Enrollment", both of which are incorporated herein by reference in their entirety.

BACKGROUND

A user is often asked for authentication when initiating an electronic communication. For example, where the user wishes to secure items over the Internet, the user is asked for authentication (i.e., proof that the user initiating the communication is who they say they are) before remuneration occurs. Such authentication is typically a password or security code that is associated with an identity of an account used to obtain the merchandise or service.

Many databases containing biometric templates already exist. For example, in India there is a unique identifier (ID) server that hosts a database with fingerprint templates of over one billion people. Other countries have similar databases. These databases are for example run by governments. Thus, many people have their biometric information already stored in a database in association with a unique identifying number. With the wide availability of biometric scanners in smartphones, these databases may be used to authenticate a user by capturing a biometric image and sending it to the existing database for authentication against a corresponding biometric template.

SUMMARY

One embodiment relates to a method for biometric authentication using external databases. A server receives a request for authentication of a user from a requestor. A notification is sent to a user device associated with the user from the server. A biometric image is received within the server in response to the notification. A biometric ID of the user is sent from the server to an external database for identifying a biometric template stored with the external database. An authentication result indicative of a match between the biometric image and the biometric template is determined and the authentication result is sent to the requestor.

Another embodiment relates to a biometric authentication server for biometric authentication using external databases. The biometric authentication server includes a user device interface for communicating with a user device, a database interface for communicating with a third party database, a processor, and a memory communicatively coupled to the processor and storing machine readable instructions that when executed by the processor perform the steps of: receiving, from a requestor, a request for authentication of a user; sending a notification to a user device associated with the user; receiving a biometric image associated with the user in response to the notification; sending a biometric ID of the user to an external database for identifying a biometric template stored with the external database; determining an authentication result indicative of a match between the biometric image and the biometric template; and sending the authentication result to the requestor.

Another embodiment relates to a non-transitory computer readable medium with computer executable instructions stored thereon is executed by a processor of a server to perform the method of biometric authentication using external databases. The medium includes instructions for receiving, from a requestor, a request for authentication of a user; instructions for sending a notification to a user device associated with the user; instructions for receiving a biometric image associated with the user in response to the notification; instructions for sending a biometric ID of the user to an external database for identifying a biometric template stored with the external database; instructions for determining an authentication result indicative of a match between the biometric image and the biometric template; and instructions for sending the authentication result to the requestor.

DETAILED DESCRIPTION OF THE EMBODIMENTS

Figure 1:
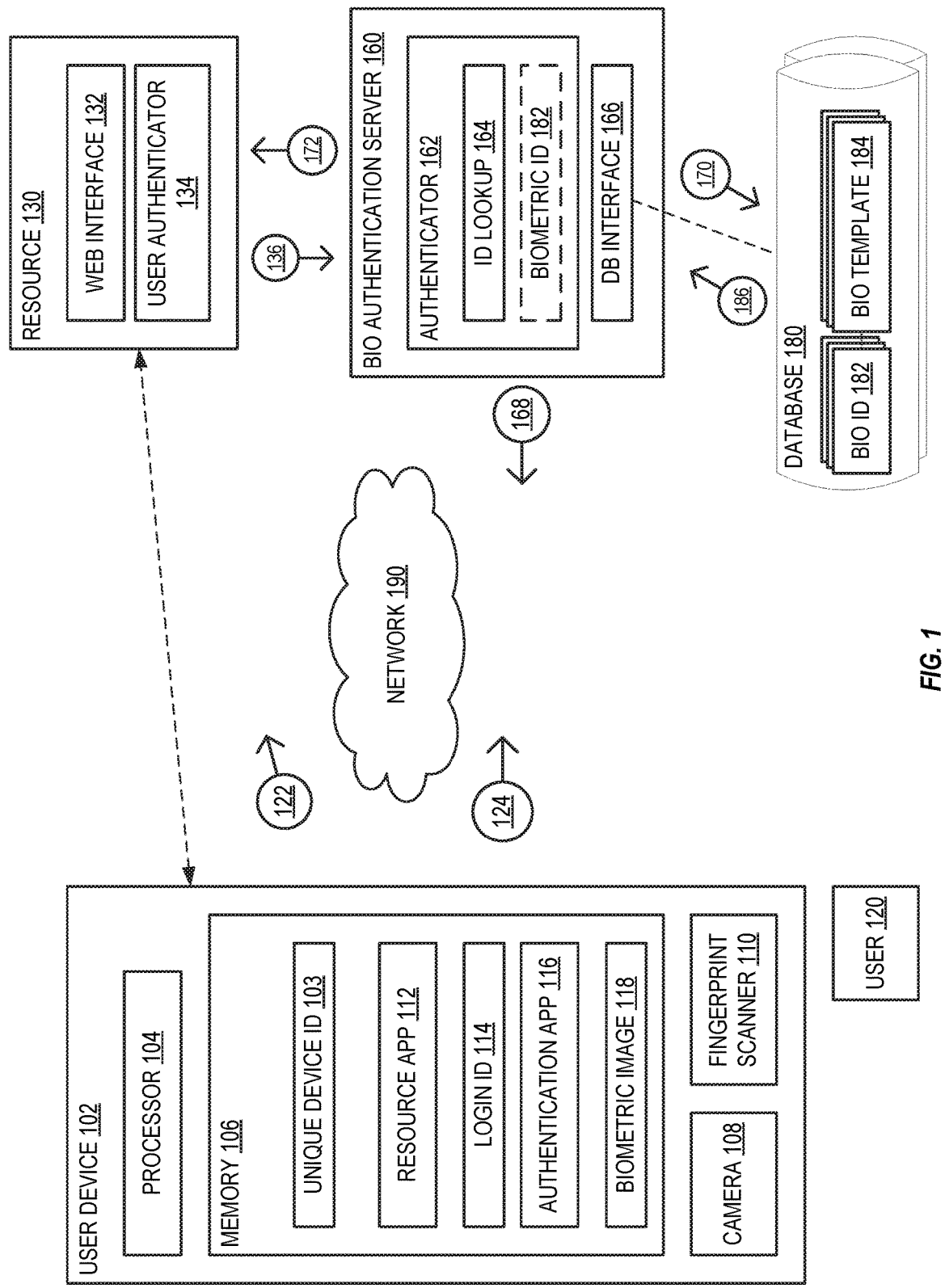
FIG. 1 shows one example system for leveraging existing databases for biometric authentication, in an embodiment.

FIG. 1 shows one example system 100 for leveraging existing databases for biometric authentication. In the example of FIG. 1, a user device 102 interacts with a resource 130. User device 102 is a computer and includes a processor 104 communicatively coupled to a memory 106, and a camera 108. In certain embodiments, user device 102 also includes a fingerprint scanner 110. User device 102 is selected from the group including: a smartphone, a personal computer, a tablet computer, a notebook computer, and so on.

To access or utilize resource 130, a user 120 may require authentication. Biometric templates of user 120 may be stored within an external database 180, owned and/or maintained by a third party, having been previously created for other purposes and/or resources for example. These previously created biometric templates may advantageously be used to authenticate user 120. For example, resource 130 may represent a merchant from where user 120 wishes to secure items over the Internet. Before remuneration occurs, user 120 is advantageously authenticated using external database 180. Thus, even though user 120 has not specifically enrolled for authentication with resource 130, previously generated and stored biometric templates of user 120 are successfully used to authenticate user 120 to resource 130.

A user 120 uses user device 102 to send a request 122 to a web interface 132 of a resource 130 via a network 190. For example, user 120 may use user device 102 to request and/or change certain information at resource 130. In another example, user 120 uses user device 102 to select an item or service for procurement from web interface 132 of resource 130. Web interface 132 is for example a website and user 120 uses a resource app 112 running on user device 102 to select items to procure. Network 190 may represent one or more of the Internet, a local area network, a cellular network, a wide area network, a financial transaction network, and so on.

Resource 130, based upon request 122 from user device 102, invokes a user authenticator 134 to authenticate the authority of user 120 before fulfilling request 122. In certain embodiments, based upon attributes of request 122, resource 130 may require a certain type of authentication, and/or may require multiple types of authentication. User authenticator 134 sends an authentication request message 136 to a biometric authentication server 160. In embodiments, biometric authentication server 160 is a computer that includes a processor and memory (not shown) that operates to authenticate user 120 using a biometric template 184 corresponding to user 120. The biometric template 184 was previously generated for user 120 by a third party, and is stored within existing external database 180 of the third party. For example, the third party may represent one or more of a government entity, a security entity, and so on. External database 180 stores biometric template 184 in association with a biometric ID 182. Biometric ID 182 is an identifying label (e.g., one or more of a social security number, a driving license number, a tax ID, a passport number, and so on) that uniquely identifies user 120. External database 180 may represent one of many such external databases run by the same or different parties to store biometric templates. External database 180 is selected for matching, for example, based upon the type of biometric captured. For example, where a fingerprint image is captured, external database 180 represents an existing database of fingerprint type biometric templates that may be used to authenticate user 120.

User 120 may have more than one uniquely identifying label, and an authenticator 162 of biometric authentication server 160 utilizes an ID lookup 164 to determine biometric ID 182 from other provided labels. For example, user 120 may enroll with biometric authentication server 160 and provide an association between a login ID 114, utilized by user device 102 to access web interface 132, and biometric ID 182, such that ID lookup 164 may determine biometric ID 182 from login ID 114 received from user authenticator 134 of resource 130.

In embodiments, after receiving authentication request message 136, authenticator 162 sends a notification 168 (e.g., a push notification) to user device 102 requesting biometric authentication. An authentication app 116, running within user device 102 is activated by notification 168, and interacts with user 120 to capture at least one biometric image 118 of user 120. For example, where user device 102 includes both camera 108 and fingerprint scanner 110, authentication app 116 may offer user 120 a choice of which of a facial image, an iris image, and a fingerprint image to capture as biometric image 118. Where user device 102 includes camera 108, but no fingerprint scanner, authentication app 116 instructs user 120 to capture one or more of a facial image and an iris image as biometric image 118. In certain embodiments, authentication app 116 may allow user 120 to capture a retinal image as biometric image 118, where camera 108 supports such image capture. Authentication app 116 then sends biometric image 118 to biometric authentication server 160 as message 124. In one embodiment, authentication app 116 is part of resource app 112.

Authenticator 162 receives message 124 with biometric image 118 and interacts with external database 180 to determine whether biometric image 118 matches biometric template 184 corresponding to biometric ID 182 determined by ID lookup 164. In one embodiment, message 124 also includes a unique device ID 103 that uniquely identifies user device 102, wherein authenticator 162 ensures that message is received from a device previously registered with biometric authentication server 160 by user 120. In another embodiment, unique device ID 103 is associated with authentication app 116. Authenticator 162 may process and convert biometric image 118 into a more suitable format (e.g., a template) for matching based upon the type of biometric it contains and the format of biometric template 184 of external database 180. In one embodiment, database interface 166 retrieves biometric template 184, identified by biometric ID 182, and then matches biometric image 118 to biometric template 184 to determine whether they match. In another embodiment, database interface 166 sends biometric ID 182, determined by ID lookup 164, and biometric image 118, received from user device 102, to external database 180 in message 170 and receives, in message 186 by return, an indication of whether biometric image 118 matches biometric template 184. In certain embodiments, database interface 166 interacts with external database 180 to determine whether biometric ID 182 is stored therein, and if so, whether the biometric type of stored biometric templates 184 corresponds to biometric ID 182.

Authenticator 162 then sends a message 172 indicating an authentication result of user 120 to resource 130. In one embodiment, authenticator 162 also sends the authentication result to authentication app 116 for display to user 120. Thus, resource 130 may selectively respond to request 122 from user device 102 based upon the indicated authentication of user 120 in message 172. For example, where user 120 is making a purchase from resource 130, resource 130 may proceed with the transaction based upon successful authentication of user 120 or decline the transaction based upon unsuccessful authentication of user 120.

Advantageously, user 120 does not have to provide biometric images to enroll with biometric authentication server 160, since user 120 has already provided biometric images to form biometric template 184 of external database 180.

In one embodiment, biometric authentication server 160 is part of a financial network that handles financial transactions, wherein biometric authentication server 160 is invoked to authenticate financial transactions based upon captured biometric image 118 of user 120 and using external database 180 of a third party. In this embodiment, ID lookup 164 may determine biometric ID 182 from an account number of a transaction being authenticated, thereby ensuring that authentication is correct for the transaction.

Figure 2A:
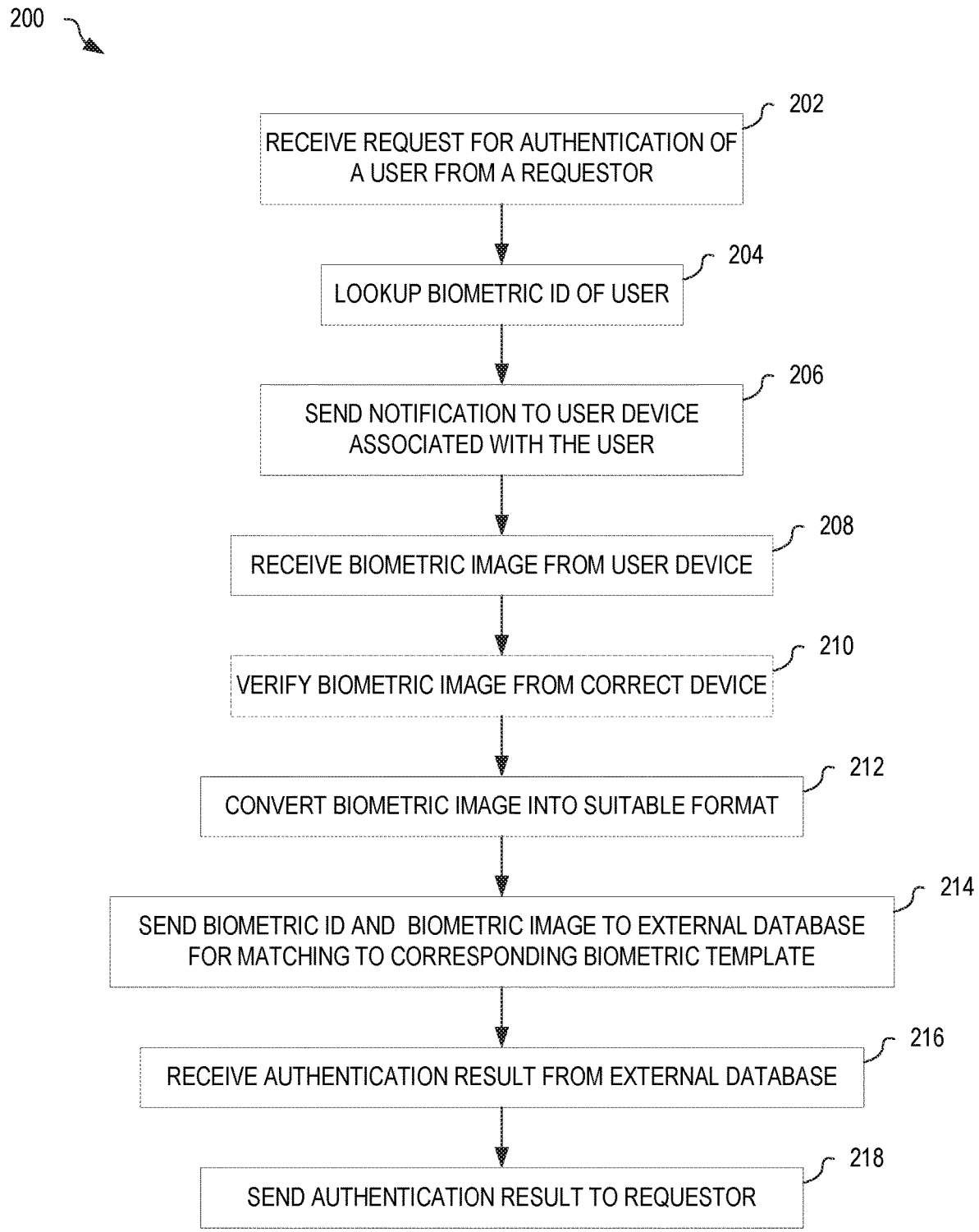
FIG. 2A is a flowchart illustrating one example method for biometric authentication using existing databases, in an embodiment.

FIG. 2A is a flowchart illustrating one example method 200 for biometric authentication using existing databases. Method 200 is for example implemented within biometric authentication server 160 of FIG. 1. In step 202, method 200 receives a request for authentication of a user from a requestor. In one example of step 202, authenticator 162 receives authentication request message 136 from user authenticator 134 of resource 130 requesting authentication of user 120. In step 204, method 200 looks up a biometric ID of the user received in step 202. In one example of step 204, authenticator 162 invokes ID lookup 164 to determine biometric ID 182 if user 120, based upon login ID 114 and/or unique device ID 103, is included within authentication request message 136. In certain embodiments, step 204 occurs at any point between step 202 and step 214.

In step 206, method 200 sends a notification to the user device associated with the user. In one example of step 206, authenticator 162 sends notification 168 to user device 102 requesting biometric authentication. In step 208, method 200 receives at least one biometric image from the user device. In one example of step 208, authenticator 162 receives, in message 124, biometric image 118 from authentication app 116 of user device 102 in response to notification 168.

In one embodiment, step 210 is included, and method 200 verifies that the biometric image is from the correct device. In one example of step 210, authenticator 162 verifies that message 124 is from user device 102 based upon unique device ID 103 received within message 124 matching a previous registered device ID associated with biometric ID 182.

In step 212, method 200 converts the biometric image into a suitable format for the external database (if needed). In one example of step 212, authenticator 162 converts biometric image 118 into a format suitable for matching to biometric template 184 by external database 180.

In step 214, method 200 sends the biometric ID of step 204 and biometric image received in step 208 and converted in step 212 to external database for matching to corresponding biometric template. In one example of step 214, authenticator 162 invokes database interface 166 to send message 170 including biometric ID 182 and biometric image 118 (in converted form) to external database 180 for matching.

In step 216, method 200 receives an authentication result from the external database. In one example of step 216, authenticator 162 receives message 186 indicating whether biometric image 118 matches biometric template 184 associated with biometric ID 182 from external database 180.

In step 218, method 200 sends an authentication result to the requestor. In one example of step 218, authenticator 162 sends message 172 to user authenticator 134 of resource 130 indicating authentication of user 120 as determined using external database 180.

Figure 2B:
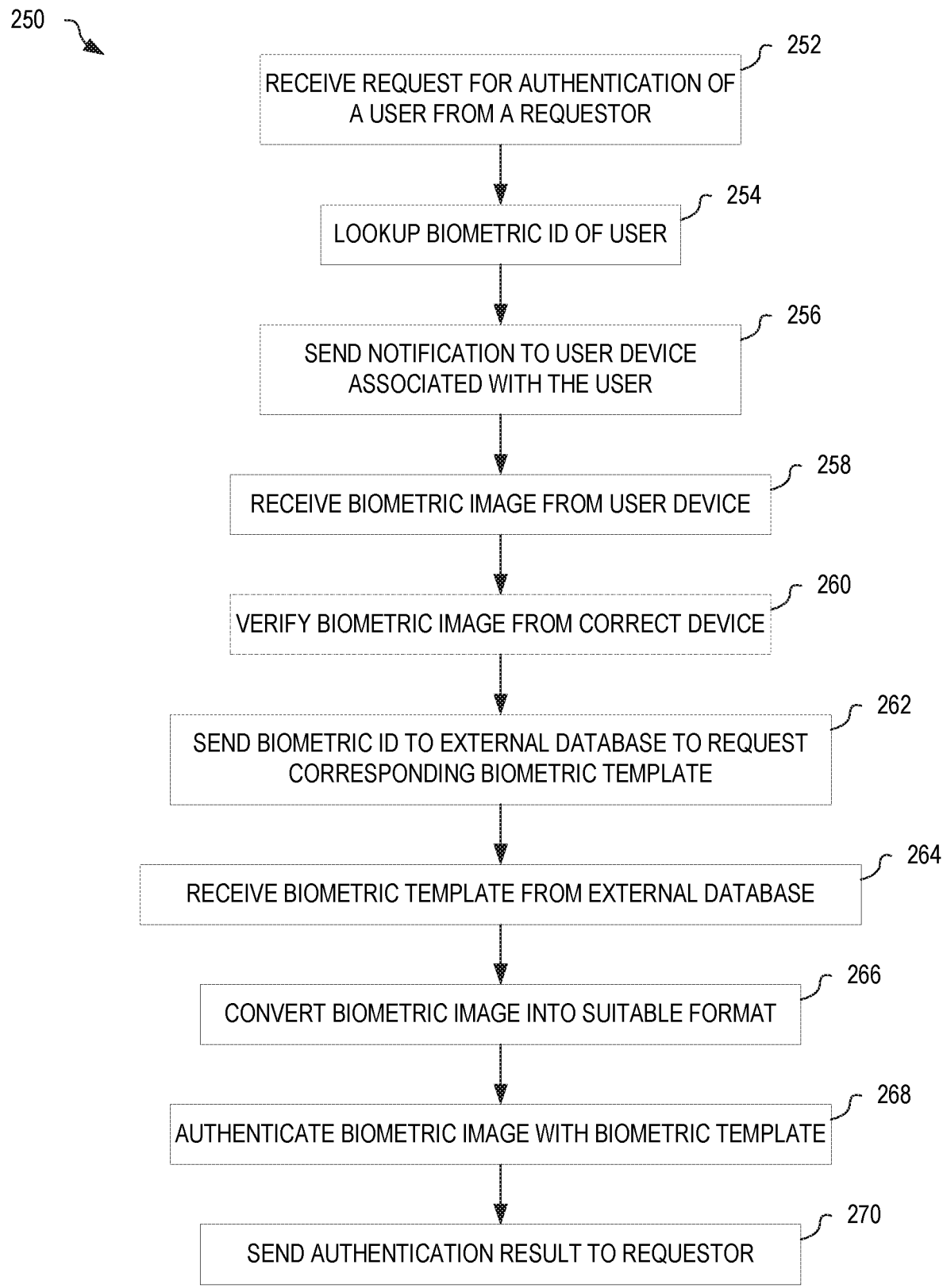
FIG. 2B is a flowchart illustrating another example method for biometric authentication using existing databases, in an embodiment.

FIG. 2B is a flowchart illustrating another example method 250 for biometric authentication using existing databases. Method 250 is for example implemented within biometric authentication server 160 of FIG. 1.

In step 252, method 250 receives a request for authentication of a user from a requestor. In one example of step 252, authenticator 162 receives authentication request message 136 from user authenticator 134 of resource 130 requesting authentication of user 120. In step 254, method 250 looks up a biometric ID of the user received in step 252. In one example of step 254, authenticator 162 invokes ID lookup 164 to determine biometric ID 182 if user 120, based upon login ID 114 and/or unique device ID 103, is included within authentication request message 136. In certain embodiments, step 254 occurs at any point between step 252 and step 262.

In step 256, method 250 sends a notification to the user device associated with the user. In one example of step 256, authenticator 162 sends notification 168 to user device 102 requesting biometric authentication. In step 258, method 250 receives at least one biometric image from the user device. In one example of step 258, authenticator 162 receives, in message 124, biometric image 118 from authentication app 116 of user device 102 in response to notification 168.

In one embodiment, step 260 is included, and method 250 verifies that the biometric image is from the correct device. In one example of step 260, authenticator 162 verifies that message 124 is from user device 102 based upon unique device ID 103 received within message 124 matching a previous registered device ID associated with biometric ID 182.

In step 262, method 250 sends the biometric ID of step 254 to external database to request a corresponding biometric template. In one example of step 262, authenticator 162 invokes database interface 166 to send message 170 including biometric ID 182 to external database 180.

In step 264, method 250 receives the corresponding biometric template from the external database. In one example of step 264, authenticator 162 receives biometric template 184, corresponding to biometric ID 182, from external database 180.

In step 266, method 250 converts the biometric image of step 258 into a suitable format for the biometric template (if needed). In one example of step 266, authenticator 162 converts biometric image 118 into a format suitable for matching to biometric template 184.

In step 268, method 250 authenticates the biometric image with the biometric template. In one example of step 268, authenticator 162 authenticates converted biometric image 118 with biometric template 184 received from external database 180 to determine an authentication result.

In step 270, method 250 sends an authentication result to the requestor. In one example of step 270, authenticator 162 sends message 172 to user authenticator 134 of resource 130 indicating authentication of user 120 as determined using external database 180.

Figure 3:
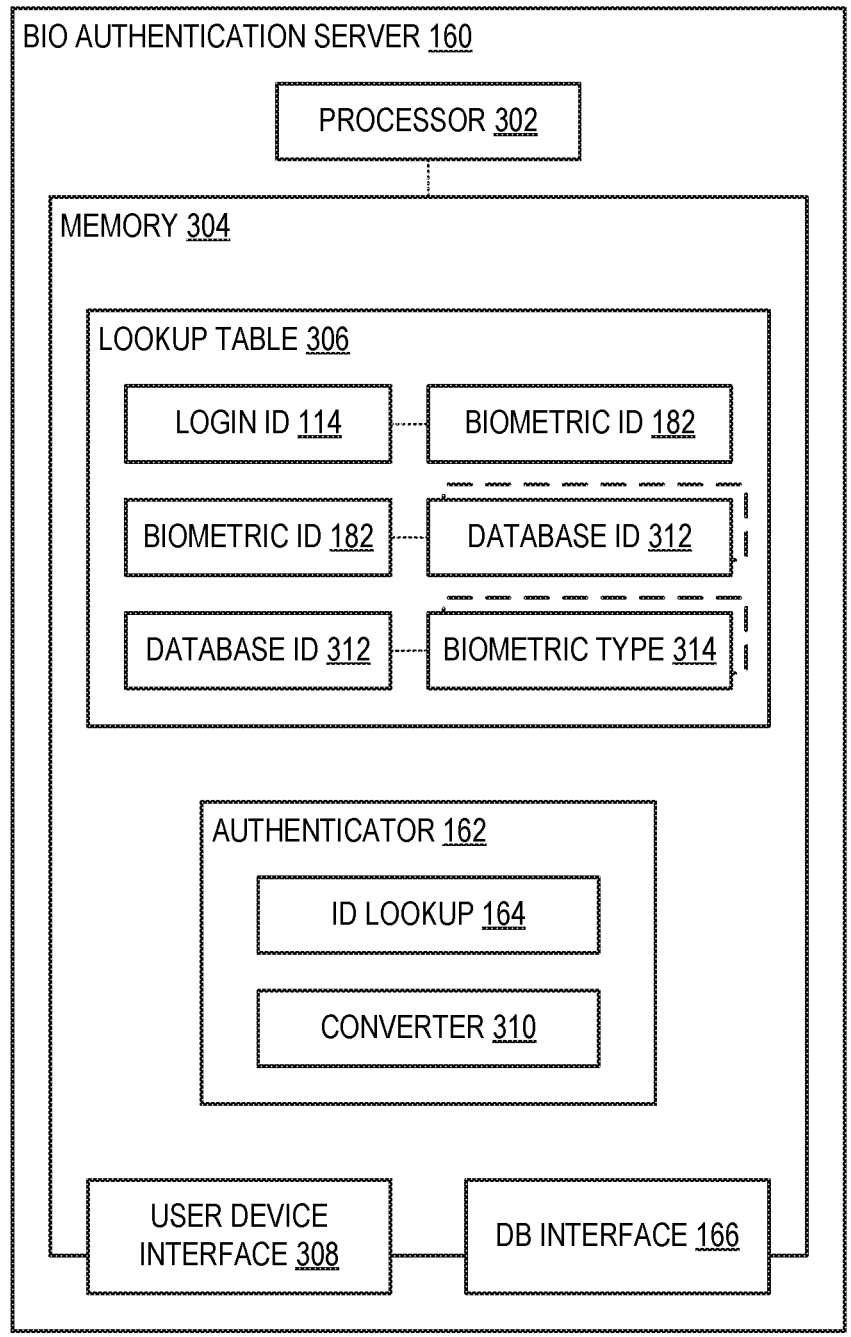
FIG. 3 shows the biometric authentication server of FIG. 1 in further detail, in an embodiment.

FIG. 3 shows an embodiment of biometric authentication server 160 of FIG. 1 in further detail. Biometric authentication server 160 has a processor 302 that is communicatively coupled with a memory 304. Memory 304 stores authenticator 162 with machine readable instructions that are executed by processor 302 to provide functionality of biometric authentication server 160, as described above. Memory 304 may also store a lookup table 306 that correlates login ID 114 with biometric ID 182, such that ID lookup 164 may determine biometric ID 182 based upon login ID 114. Biometric authentication server 160 includes database interface 166 and a user device interface 308 that allows authenticator 162 to communicate with user device 102. For example, user device interface 308 facilitates sending of notification 168 and receiving of biometric image 118 within message 124.

In certain embodiments, lookup table 306 also allows authenticator 162 to determine, based upon biometric ID 182, which external databases 180 contain biometric templates of user 120. For example, lookup table 306 may store one or more database IDs 312 corresponding to biometric ID 182, where each database ID 312 defines which one of many external databases 180 contain biometric templates 184 corresponding to biometric ID 182. For example, based upon results from lookup table 306, authenticator 162 may determine whether or not authentication of user 120 is possible, and which external databases 180 may be used for authentication of user 120.

In certain embodiments, lookup table 306 also allows authenticator 162 to determine, based upon database ID 312, a biometric type 314 of biometric templates 184 stored within external database 180 corresponding to database ID 312. This allows authenticator 162 to determine which biometric types 314 may be used to authenticate user 120, and thereby, in notification 168, request that the captured biometric image 118 be of a particular biometric type 314. Where more than one biometric type 314 of biometric template 184 is available for biometric ID 182, user 120 may be able to choose the type of biometric capture to perform based upon those available on user device 102.

In certain embodiments, communication between database interface 166 and external database 180 utilizes a standardized protocol. In other embodiments, lookup table 306 provides additional information relating to external databases 180 and biometric template 184 to authenticator 162. In one example, lookup table 306 provides address and protocol information to allow database interface 166 to communicate with external database 180.

Figure 4:
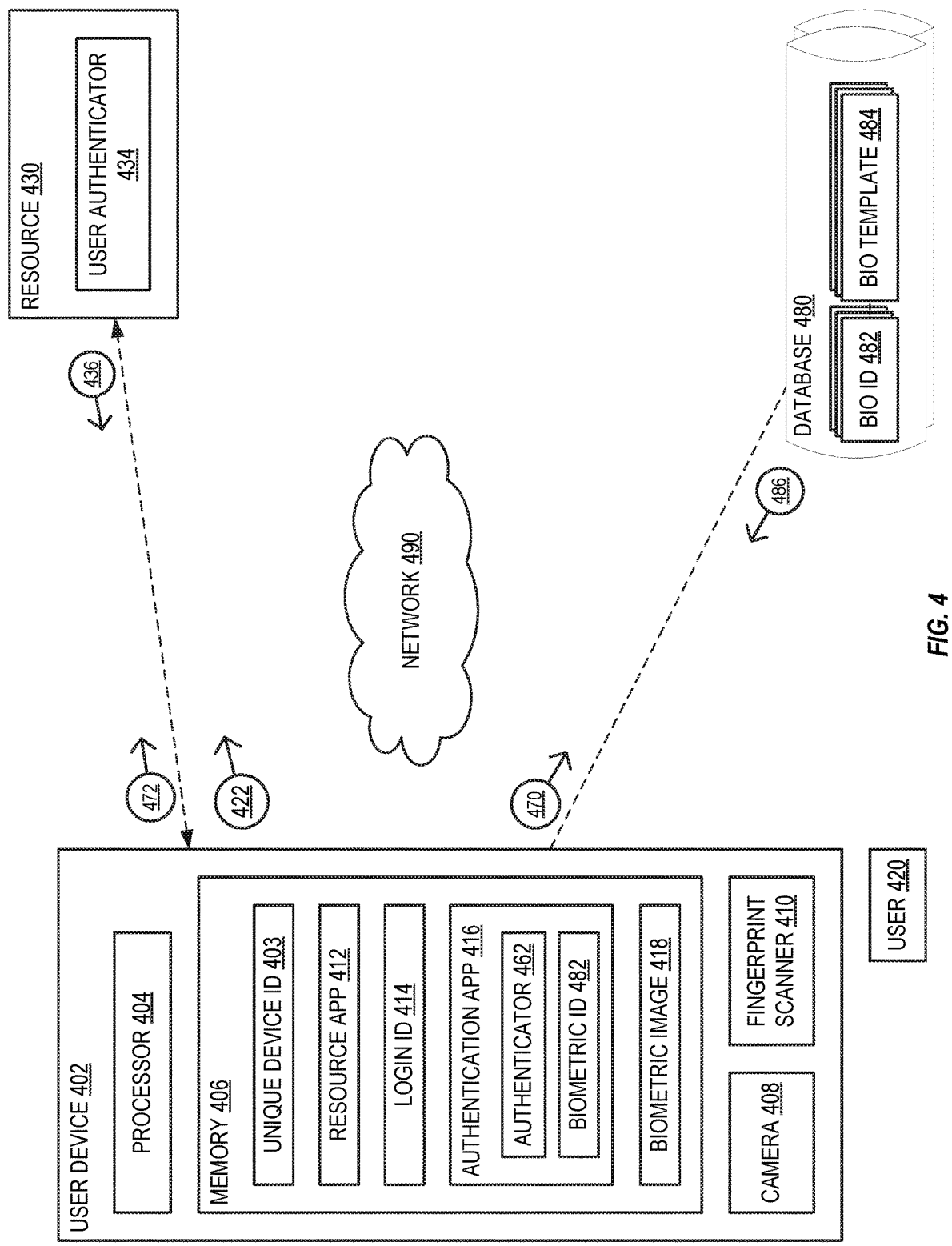
FIG. 4 shows another example system for leveraging existing databases for biometric authentication, in an embodiment.

FIG. 4 shows another example system 400 for leveraging existing databases for biometric authentication. Specifically, in system 400, authentication is performed by a user device 402 and a separate biometric authentication server 160 is not required. For example, a user device 402 may be similar to user device 102, a resource 430 may be similar to resource 130, and an external database 480 may be similar to external database 180.

In the example of FIG. 4, user device 402 interacts with a resource 430. User device 402 includes a processor 404 communicatively coupled to a memory 406, and a camera 408. In certain embodiments, user device 402 also includes a fingerprint scanner 410. User device 402 is selected from the group including: a smartphone, a personal computer, a tablet computer, a notebook computer, and so on.

To access or utilize resource 430, user 420 may require authentication. Previously created biometric templates of user 420 are stored within external database 480, owned and/or maintained by a third party. These previously created biometric templates may advantageously be used to authenticate user 420. For example, resource 430 may represent an entity that stores data that user 420 wishes to access. Before user 420 is allowed access to the data, user 420 is advantageously authenticated using external database 480. Thus, even though user 420 has not specifically enrolled for authentication with resource 430, previously generated and stored biometric templates of user 420 are successfully used to authenticate user 420 to resource 430. To enable authentication, user device 402 loads an authentication app 416 that is for example created and trusted by resource 430. Such communication can occur via a network 490. Network 490 may represent one or more of the Internet, a local area network, a cellular network, a wide area network, a financial transaction network, and so on.

Resource 430, based upon request 422 from user device 402, may request user device 402 to authenticate the authority of user 420 before fulfilling request 422. User device 402 (and, e.g., resource app 412 in particular) then invokes authentication app 416 to authenticate user 420 using a biometric template 484 corresponding to user 420. Authentication app 416 may be configured with a biometric ID 482 of user 420. Biometric ID 482 may be similar to biometric ID 182 and uniquely identifies user 420. Authentication app 416 may select external database 480 based upon the type of biometric captured by user device 402. For example, where a fingerprint image is captured, external database 480 represents an existing database of fingerprint type biometric templates that may be used to authenticate user 420.

Authentication app 416 may be configured to utilize more than one external database 180 that contains biometric information of user 420 corresponding to biometric ID 482. In embodiments, after receiving authentication request message 436, resource app 412 invokes authentication app 416 to authenticate user 420. In certain embodiments, resource app 412 and authentication app 416 are combined into a single app. Authentication app 416 interacts with user 420 to capture at least one biometric image 418 of user 420. For example, where user device 402 includes both camera 408 and fingerprint scanner 410, authentication app 416 may offer user 420 a choice of which of a facial image, an iris image, and a fingerprint image to capture as biometric image 418 based upon available typed of biometric templates within external database 480. In certain embodiments, authentication app 416 may allow user 420 to capture a retinal image as biometric image 118, where camera 408 supports such image capture. Alternatively, the user 420 may be instructed as to which type of biometric will be captured for authentication. Authentication app 416 may convert biometric image 418 into an appropriate format for use by external database 180.

In one embodiment, authentication app 416 retrieves biometric template 484, identified by biometric ID 482, from external database 480 and then matches biometric image 418 to biometric template 484 to determine whether they match. In another embodiment, authentication app 416 sends biometric ID 482 and biometric image 418 to external database 480 in message 470 and receives, in message 486 by return, an indication of whether biometric image 418 matches biometric template 484.

Authentication app 416 then sends a message 472 indicating an authentication result of user 420 to resource 430. In certain embodiments, authenticator 462 also sends the authentication result to authentication app 416 for display to user 420. Thus, resource 430 may selectively respond to request 422 from user device 402 based upon the indicated authentication of user 420 in message 472. For example, where user 420 is making a purchase from resource 430, resource 430 may proceed with the transaction based upon successful authentication of user 420 or decline the transaction based upon unsuccessful authentication of user 420.

Advantageously, user 420 does not have to provide biometric images to enroll for biometric authentication with resource 430, since user 420 has already provided biometric images to form biometric template 484 of external database 480.

It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method for biometric authentication using one or more third-party external databases, the method comprising:
receiving, with a server, an authentication request message for the biometric authentication of a user from a requestor, wherein the user has not enrolled in the biometric authentication of a biometric template of the user with the server, wherein the user has stored a biometric identifier (ID) with the server, and wherein the authentication request message includes a login identifier (ID) and a unique device identifier (ID);
performing, with the server, an ID lookup to determine the biometric identifier (ID) of the user based on at least one of the login ID or the unique device ID;
sending, with the server, a notification to a user device associated with the unique device ID, the notification requesting a biometric image of the user;
receiving, with the server, the biometric image in response to the notification, the biometric image being from the user device;

sending, with the server, the biometric identifier (ID) of the user and the biometric image to only the one or more third-party external databases;
controlling, with the server, only the one or more third-party external databases to identify a biometric template stored in the one or more third-party external databases with the biometric ID and matches the biometric image;
receiving, with the server, an authentication result that is indicative of a match between the biometric image and the biometric template; and
sending, with the server, the authentication result to the requestor, wherein, at the time the authentication result is sent to the requestor, the user has not enrolled in the biometric authentication with the server,
wherein the requestor is different than the user and the user device, wherein the requestor authorizes and provides access to a resource based on the authentication result that is indicative of the match between the biometric image and the biometric template, and
wherein the notification is configured to cause the user device to execute an authentication application, and request a capture of the biometric image of the user with the authentication application.

2. The method of claim 1, wherein receiving the authentication result that is indicative of the match between the biometric image and the biometric template further includes
sending the biometric image to only the one or more third-party external databases in association with the biometric ID; and
receiving the authentication result from only the one or more third-party external databases.

3. The method of claim 1, wherein receiving the authentication result that is indicative of the match between the biometric image and the biometric template further includes
receiving the biometric template from only the one or more third-party external databases; and
comparing, with the server, the biometric image to the biometric template to determine the authentication result.

4. The method of claim 1, further comprising converting the biometric image into a format suitable for matching to the biometric template after receiving the biometric image associated with the user and prior to determining the authentication result.

5. The method of claim 1, further comprising selecting one of the one or more third-party external databases based upon a type of biometric templates stored in the one or more third-party external databases, the type of biometric templates being one selected from a group consisting of:
fingerprint biometric templates,
facial biometric templates,
iris biometric templates, and
retina biometric templates.

6. The method of claim 1, wherein the biometric image further includes a fingerprint image.

7. The method of claim 1, wherein the biometric image further includes a facial image.

8. The method of claim 1, wherein the biometric ID further includes an identifying label selected from a group consisting of:
a social security number,
a driving license number,
a tax ID, and
a passport number.

9. The method of claim 1, wherein the notification further includes a request for a specific type of the biometric image.

10. A biometric authentication server for biometric authentication using one or more third-party external databases, the biometric authentication server comprising:
a user device interface configured to communicate with a user device;
a database interface configured to communicate with only the one or more third- party external databases;
an electronic processor; and
a memory communicatively coupled to the electronic processor and storing machine readable instructions that, when executed by the electronic processor, perform a set of operations including
receiving an authentication request message for biometric authentication of a user from a requestor, wherein the user has not enrolled in the biometric authentication of a biometric template of the user with the biometric authentication server, wherein the user has stored a biometric identifier (ID) with the server, and wherein the authentication request message includes a login identifier (ID) and a unique device identifier (ID);
performing, with the server, an ID lookup to determine the biometric identifier (ID) of the user based on at least one of the login ID or the unique device ID;
sending a notification to the user device associated with the unique device ID, the notification requesting a biometric image of the user;
receiving the biometric image in response to the notification, the biometric image being from the user device;
sending the biometric identifier (ID) of the user and the biometric image to only the one or more third-party external databases;
controlling only the one or more third-party external databases to identify a biometric template stored in the one or more third-party external databases with the biometric ID and matches the biometric image;
receiving an authentication result that is indicative of a match between the biometric image and the biometric template; and
sending the authentication result to the requestor,
wherein, at the time the authentication result is sent to the requestor, the user has still not enrolled in the biometric authentication with the server,
wherein the requestor is different than the user and the user device,
wherein the requestor authorizes and provides access to a resource based on the authentication result that is indicative of the match between the biometric image and the biometric template, and
wherein the notification is configured to cause the user device to execute an authentication application, and request a capture of the biometric image of the user with the authentication application.

11. The biometric authentication server of claim 10, wherein the set of operations further includes converting the biometric image into a format suitable for matching to the biometric template.

12. The biometric authentication server of claim 10, wherein receiving the authentication result that is indicative of the match between the biometric image and the biometric template further includes
sending the biometric image to only the one or more third-party external databases in association with the biometric ID; and
receiving the authentication result from only the one or more third-party external databases.

13. The biometric authentication server of claim 10, wherein receiving the authentication result that is indicative of the match between the biometric image and the biometric template further includes
   receiving the biometric template from only the one or more third-party external databases; and
   comparing the biometric image to the biometric template to determine the authentication result.

14. The biometric authentication server of claim 10, wherein the set of operations further includes converting the biometric image into a format suitable for matching to the biometric template prior to determining the authentication result.

15. A non-transitory computer readable medium with computer executable instructions stored thereon is executed by an electronic processor to perform a set of operations comprising:
   receiving an authentication request message for biometric authentication of a user from a requestor, wherein the user has not enrolled in the biometric authentication of a biometric template of the user, wherein the user has stored a biometric identifier (ID) with the server, and wherein the authentication request message includes a login identifier (ID) and a unique device identifier (ID);
   performing an ID lookup to determine the biometric identifier (ID) of the user based on at least one of the login ID or the unique device ID;
   sending a notification to a user device associated with the unique device ID, the notification requesting a biometric image of the user;
   receiving the biometric image in response to the notification, the biometric image being from the user device;
   sending the biometric ID of the user and the biometric image to one or more third- party external databases;
   controlling only the one or more third-party external databases to identify a biometric template stored in the one or more third-party external databases with the biometric ID and matches the biometric image;
   receiving an authentication result that is indicative of a match between the biometric image and the biometric template; and
   sending the authentication result to the requestor,
   wherein, at the time the authentication result is sent to the requestor, the user has still not enrolled in the biometric authentication with the server,
   wherein the requestor is different than the user and the user device,
   wherein the requestor authorizes and provides access to a resource based on the authentication result that is indicative of the match between the biometric image and the biometric template, and
   wherein the notification is configured to cause the user device to execute an authentication application, and
   request a capture of the biometric image of the user with the authentication application.

16. The non-transitory computer readable medium of claim 15, wherein the biometric ID further includes an identifying label selected from a group consisting of:
   a social security number,
   a driving license number,
   a tax ID, and
   a passport number.

17. The non-transitory computer readable medium of claim 15, wherein the set of operations further includes selecting one of the one or more third-party external databases based upon a type of biometric templates stored in the one of the one or more third-party external databases, the type of biometric templates being one selected from a group consisting of:
   fingerprint biometric templates,
   facial biometric templates,
   iris biometric templates, and
   retina biometric templates.

18. The non-transitory computer readable medium of claim 15, wherein receiving the authentication result that is indicative of the match between the biometric image and the biometric template further includes
   sending the biometric image to only the one or more third-party external databases in association with the biometric ID; and
   receiving the authentication result from only the one or more third-party external databases.

19. The non-transitory computer readable medium of claim 15, wherein receiving the authentication result that is indicative of the match between the biometric image and the biometric template further includes
   receiving the biometric template from only the one or more third-party external databases; and
   comparing the biometric image to the biometric template to determine the authentication result.

20. The non-transitory computer readable medium of claim 15, wherein the set of operations further includes converting the biometric image into a format suitable for matching to the biometric template.

21. The method of claim 1, wherein the authentication application is part of a resource application that is associated with the resource.

22. The non-transitory computer readable medium of claim 15, wherein the authentication application is part of a resource application that is associated with the resource.

23. The biometric authentication server of claim 10, wherein the authentication application is part of a resource application that is associated with the resource.

* * * * *